(12) United States Patent
Basfar et al.

(10) Patent No.: US 9,745,427 B2
(45) Date of Patent: Aug. 29, 2017

(54) COMPOSITION AND METHOD OF MAKING SHAPE MEMORY POLYMER FOR BIOMEDICAL APPLICATIONS

(71) Applicant: King Abdulaziz City for Science and Technology, Riyadh (SA)

(72) Inventors: Ahmed Ali Basfar, Riyadh (SA); Salah Lofty Ahmed Khalil, Cairo (EG)

(73) Assignee: King Abdulaziz City for Science and Technology "KACST", Riyadh (SA)

( * ) Notice: Subject to any disclaimer, the term of this patent is extended or adjusted under 35 U.S.C. 154(b) by 94 days.

(21) Appl. No.: 13/931,951

(22) Filed: Jun. 30, 2013

(65) Prior Publication Data
US 2015/0005407 A1    Jan. 1, 2015

(51) Int. Cl.
| | |
|---|---|
| C08F 2/46 | (2006.01) |
| C08F 2/50 | (2006.01) |
| C08G 61/04 | (2006.01) |
| C08J 3/24 | (2006.01) |
| C08J 3/28 | (2006.01) |
| B29C 61/00 | (2006.01) |

(52) U.S. Cl.
CPC ............... *C08J 3/246* (2013.01); *C08J 3/24* (2013.01); *C08J 3/28* (2013.01); *B29C 61/003* (2013.01); *C08J 2329/04* (2013.01); *C08J 2435/02* (2013.01); *C08L 2201/12* (2013.01)

(58) Field of Classification Search
CPC . C08J 3/246; C08J 2329/04; C08J 3/28; C08J 2435/02; C08K 7/24; B29C 61/003; C08L 2201/12; C08L 29/04; C08L 33/14
USPC ............... 522/79, 74, 71, 189, 184, 1; 520/1
See application file for complete search history.

(56) References Cited

U.S. PATENT DOCUMENTS

2006/0216508 A1*  9/2006  Denisyuk ............... B82Y 10/00
                                                        428/402

FOREIGN PATENT DOCUMENTS

JP         2008-001898     *    1/2008

OTHER PUBLICATIONS

Lendlein et al, Shape-Memory Polymers, 2002, Angew. Chem. Int. Ed., 41, 2034-2057.*
Miaudet et al, Nov. 23, 2007, Shape and Temperature Memory of Nanocomposites with Broadened Glass Transition, Science, vol. 318, 1294-1296.*
Kuan-Jiuh et al, JP 2008-001898 Machine Translation, Jan. 10, 2008.*

* cited by examiner

*Primary Examiner* — Jessica E Whiteley
(74) *Attorney, Agent, or Firm* — Geeta Kadambi; Riddhi IP LLC

(57) ABSTRACT

Shape memory polymers (SMP) based on poly vinyl alcohol (PVA) in the presence of 2-carboxyethyl acrylate oligomers (CEA), multi-wall carbon nanotubes (MWCNTs) and cross linked by ionizing radiation were investigated. Chemical crosslinking by glutaraldehyde for PVA in the presence of CEA and MWCNTs was also studied. Radiation cross linked SMP exhibits good temperature responsive shape memory behavior as demonstrated by thermal properties of radiation investigated by dynamic mechanical analysis. Transition temperature at Tan $\delta$ of radiation cross linked SMP decreased significantly by 6 and 13° C. due to addition of MWCNTs. The developed SMP exhibited promising shape memory behavior of radiation cross linked SMP for biomedical applications between temperatures range of Tan $\delta$. Results on the gel fraction revealed significant reduction in swelling and increase in gelation due to chemical cross linking with glutaraldehyde. The radiation cross linked SMP reached 100% gelation at an irradiation dose of 50 kGy.

10 Claims, 15 Drawing Sheets

PVA-CNT-50 5 kGy X10,000

PVA-CNT-50 100 kGy X10,000

PVA-CNT-75 5 kGy X10,000

PVA-CNT-75 100 kGy X10,000

COMPOSITION AND METHOD OF MAKING SHAPE MEMORY POLYMER FOR BIOMEDICAL APPLICATIONS

FIELD OF INVENTION

The present invention describes a composition, method of making and using shape memory polymer (SMP). More specifically SMP is made up of poly vinyl alcohol (PVA) cross linked by a combination of crosslinking agents and ionizing radiation. The resultant product is used for biomedical applications.

BACKGROUND

Materials that respond dynamically to environmental stimuli can be called intelligent or smart materials. Shape memory polymers are intelligent materials and there is increased interest in several industries. As a result, research on such materials is actively growing both in academic and industrial sectors. Although the term 'smart material' has been conventionally used, all materials are in general responsive (and in this sense smart) but whether they are responsive in an adaptive way is questionable. A 'very smart' adaptive response is exhibited if materials/material systems are able to respond dynamically to a number of input stimuli and if this response is repeatable. For example, a simple pressure transducer that produces a voltage dependent signal upon the input pressure in a direct one-to-one fashion could be regarded as 'smart' in a basic or simple way. However, a pressure transmitter incorporating a thermocouple that measures both temperature and pressure and corrects the pressure in response to the sensor's temperature coefficient could be regarded as 'very smart'. (Lendlein, A. and Kelch, S. 2002)

SMPs have the capability of memorizing a permanent shape and one programmable for one or many temporary shapes, while spontaneously recovering their original permanent shapes from temporary deformations upon exposure to an external stimulus. As shown in FIG. 1, a closed flower (temporary shape) made of a SMP is fixed at a lower temperature and recovers from the closed state to an open flower (original shape) when the temperature is increased above its switch temperature. FIG. 1 Appearance recovery in magic mirrors (the appearance of an old woman recovers to her young appearance in a magic mirror) and shape recovery of SMPs (flower made of SMPs opens its petals at high temperature). (Hu, J. and Chen, S. 2010).

SMPs have been around since the mid-1980s. They can be stimulated by temperature, pH, chemicals, and light, and are defined as polymer materials with the ability to sense and respond to external stimuli in a predetermined way. Polymer materials have various elasticities from hard glass to soft rubber. SMPs, however, have the characteristics of both hard and soft materials, and their elasticity modulus shows reversible change with the transition temperature. Upon application of an external stimulus, they also have the ability to change their shape. Among these SMPs, the shape of thermally responsive shape memory polymers can be readily changed above the shape memory transition temperature ($T_{trans}$) and the deformation can be fixed below this temperature. As a result, when they are heated above $T_{trans}$ their original shape can be recovered automatically. Most of the shape memory effects are based on the existence of separated phases related to the coiled polymer structure, cross-links, hydrogen bonding, etc. Chains tend to go back to the random coiled configuration, unless they are constrained by permanent or temporary cross-links and partial bonding. The shape memory transformation depends on the mechanism by which polymer molecules transpose between the constrained and random entangled conformations. By making use of this change, the shape memory effect can be appropriately engineered (Behl, M., Zotzmann, J., and Lendlein, A. 2012).

Shape memory polymers are processed by conventional methods to have a permanent 'parent' shape in the molding (or spinning) process. This permanent shape is stored in the system while the polymer assumes different temporary shapes, and by heating the polymer higher than the transition temperature, the permanent shape can be restored. The phase corresponding to the higher transition polymer component acts as the physical cross-links responsible for the permanent shape. The second component acts as a molecular switch and helps to freeze temporary shapes below the transition temperature, with either the glass transition temperature ($T_g$) or the melting temperature serving as the transition/switching temperature. Chemical cross-links can also be used in elastomeric shape memory polymers, instead of physical cross-links. Temporary shapes can thus be formed above the switching temperature and can be frozen by keeping the material below the switching temperature, while the permanent shape can be obtained again by heating above the switching temperature. This is the reason why most of the thermally induced SMPs have a one-way shape memory effect: they remember one permanent shape formed at the higher temperature, while many temporary shapes are possible at lower temperatures for which the systems do not have any memory. In terms of chemical structure, SMPs can be considered as phase-segregated linear block copolymers having a hard segment and a soft segment. The hard segment acts as the frozen phase and the soft segment acts as the reversible phase. The reversible phase transformation of the soft segment is responsible for the shape memory effect (Weiss, R. A., Izzo, E., and Mandelbaum, S. 2008).

Dynamic mechanical analysis (DMA) is becoming more and more commonly seen in the analytical laboratory as a tool rather than a research curiosity. However, DMA supplies information about major transitions as well as secondary and tertiary transitions not readily identifiable by other methods. It also allows characterization of bulk properties directly affecting material performance.

DMA can be simply described as applying an oscillating force to a sample and analyzing the material's response to that force (FIG. 2 (Prior Art)). From this, one calculates properties like the tendency to flow (called viscosity) from the phase lag and the stiffness (modulus) from the sample recovery. These properties are often described as the ability to lose energy as heat (damping) and the ability to recover from deformation (elasticity) (K. P. Menard, 1999).

The DMA supplies an oscillatory force, causing a sinusoidal stress to be applied to the sample, which generates a sinusoidal strain. By measuring both the amplitude of the deformation at the peak of the sine wave and the lag between the stress and strain sine waves, quantities like the modulus, the viscosity, and the damping can be calculated It was suggested that the chemical crosslinks which remember the distribution of the physical crosslinks play a critical role in the shape restoring process (Hirai, T. et al., 1992). Hydrogels prepared by repetitive freezing and thawing of PVA aqueous solution were chemically cross linked with glutaraldehyde. The chemically cross linked hydrogel hardly changed its physical appearance, and showed good elasticity and strength as original gel. The melted gel showed shape memorizing property, that is, it could firmly hold nearly 200% of strain, keeping its original high elasticity. The strain could be released very quickly (<1 second) in boiling water, and the gel was suggested to be applied to a new type of gel actuator. The gel has attracted much attention as a material of artificial muscle or a gel actuator because of its quick reaction against environmental change. The gel thus obtained has excellent shape memorizing properties. The major differences from the so-called shape memorizing plastics are high water (or solvent) content and high elasticity, which are also the characteristics of the original gel.

Haiyan Du and Junhua Zhang (Du, H. and Zhang, J. 2010) reported the preparation of shape memory polymers based on poly(vinyl alcohol) (SM-PVA) cross-linked with glutaraldehyde. The authors discussed the influence of water content on the prepared materials. As PVA is a hydrophilic polymer, it has a small number of water molecules exposed to air, and the water molecules are helpful for shape memory characteristics. Shape memory behavior of SM-PVA, depending on the switching of chain segments, occurred at around Tg. Thermo-mechanical cycle test was performed to investigate shape memory properties, including the percentage shape recovery, shape recovery ratio, and percentage shape fixity. The authors asked two interested questions. One is whether shape recovery will take place by immersing SM-PVA in water, one good solvent of PVA. The other is whether other organic solvents of PVA will stimulate the shape recovery. To answer the two questions, they selected a series of solvents. Good solvents of PVA (water and dimethyl sulfoxide, DMSO) and several organic, poor solvents of PVA (methanol, acetic acid, tetrahydrofuran (THF) etc.) were tested. The thermal analysis results show that there is small number of water molecules in SM-PVA, and the water molecules actively affect shape memory behavior. The sharp drop of the storage modulus and the loss tangent delta confirmed that the studied material have characteristics of shape memory polymer, with the switching temperature at around $T_g$.

Hassan and Peppas (Hassan, C. M. & Peppas, N. A. 2000) described the preparation of shape memory material based on chemically cross-linked PVA to make good use of the excellent properties of PVA and to widely explore applications of PVA. The cross-link network and undisturbed crystal domain in PVA are considered as the fixed phase, while the amorphous phase acts as the reversible phase. Due to the advantages of nontoxic nature, bio-compatible and biodegradable applications, good mechanical property, etc., SM-PVA has potential use in many fields. Prepared gels were characterized in terms of their swelling and dissolution behavior, degrees of crystalinity, and crystal size distributions. In addition, the long-term stability was addressed in order to consider the appropriateness of such materials for long-term biomedical or pharmaceutical applications. The overall structure and stability were examined in terms of water content, fractional PVA dissolution, degree of crystalinity, and crystal size distribution. Results indicate that an increase in PVA chain length and an increase in the free volume within the network together allow for secondary crystallization to proceed as the material swells. Secondary crystallization was more pronounced for more loosely cross-linked samples. An increase in the free volume and mobility within the network allowed for additional crystallization to proceed during swelling.

Preparation of hybrid membranes based on PVA and MWCNTs by casting method was described by (Samal, S., et al., 2009). The morphological analysis using SEM, thermal and de-swelling behavior gave information about PVA thermal stability and de-swelling and phase transition and state of water inside of hybrid membranes. The effect of MWCNTs in the hybrid membranes was more significant when its concentration was high. The thermo degradation ($T_d$) and crystallization ($T_c$) temperatures of PVA increase by 10 and 9° C., respectively in presence of $50 \times 10^{-2}$ w $v^{-1}$% of MWCNTs. Besides, the amount of non-free water increases with increasing of MWCNTs probably due to a capillary effect. SEM micrographs showed the presence of MWCNTs agglomerates characterized by a 200-300 nm size. These agglomerates would be one of the factors influencing the amount of non-bound and bound water into the hybrid membranes. The moisture of PVA hybrid membranes in equilibrium with that of ambient increased with increase of MWCNTs content going from 7 to 16 wt. %. The behavior of swelling and de-swelling data suggested that the ionic surfactant used to disperse MWCNTs in water has an important role in the hybrid membranes as explained by some apparent contradictory results.

However, none of the above-discussed references discloses or suggests a robust SMP composition. Accordingly, there exists a need in the art to overcome the deficiencies and limitations described herein above.

SUMMARY

The present invention relates to a novel process, composition and method of making the composition for shape memory polymer and using the same. More specifically the instant disclosure, in one embodiment, shape memory polymer is made by using novel composition of poly vinyl alcohol (PVA) by crosslinking using irradiation with 2-carboxyethyl acrylate oligomer (CEA) and without CEA.

In one embodiment, carbon nano tubes 50 (CNT 50) and/or carbon nano tube 75 (CNT 75) is mixed with PVA to form a shape memory polymer (SMP). In another embodiment, a crosslinking agent oligomer: CEA is used to crosslink PVA mixed with CNT 50 and/or CNT 75 to make SMP. In another embodiment, several combinations of PVA with CEA (9:1), PVA/CEA with CNT 50, PVA/CEA with CNT 75 are used and cross linked with irradiation.

In another embodiment, using chemical crosslinking agent glutaraldehyde to cross link PVA mixed with CNT 50 and/or CNT 75 to form SMP. In one embodiment, PVA mixed with CNT 50 and/or CNT 75 and CEA (Glut-(PVA/CEA (9:1)) is added as chemical crosslinking agent to make SMP using irradiation. In another embodiment, the radiation used for crosslinking is ionizing radiation. In one embodiment, After preparation for all formulations with and without glutaraldehyde all samples were packaged in air into sealed polyethylene specimen bags then irradiated to 5, 10, 15, 20, 25, 50, 75, 100 kGy at room temperature using $^{60}$Co gamma rays source.

In one embodiment, a method of testing and characterization of the SMP is performed. The composition and methods disclosed herein may be implemented in any means for achieving various aspects, and may be used to make hydrogel for biomedical applications and various cosmetology applications. Other features will be apparent from the accompanying Fig.s and from the detailed description that follows.

BRIEF DESCRIPTION OF DRAWINGS

Example embodiments are illustrated by way of example in the accompanying Fig. and like references indicate similar elements and in which.

Other features of the present embodiments will be apparent from the accompanying Fig.s and from the detailed description that follows.

DETAILED DESCRIPTION

This invention relates to composition of shape memory polymer (SMP) using poly (vinyl alcohol) and crosslinking agents and cross-linked by ionizing radiation, method of making it and method of using it. In the instant disclosure several embodiments for the composition and method of making shape memory polymer is described. Although the present embodiments have been described with reference to specific example embodiments, it will be evident that various modifications and changes may be made to these embodiments without departing from the broader spirit and scope of the various embodiments.

Materials: 2-carboxyethyl acrylate oligomers, polyvinyl alcohol (PVA) Mw. 75,000 were procured from Sigma Aldrich. Carbon nanotube (CNT) Type 50 and 75 were producer: NanoKarbon, Korea nano Ind. Co., Surfactant: Sodium dodecyl sulfate (SDS, $C_{12}H_{25}SO_4Na$) was procured from Sigma Aldrich, unless otherwise noted it was used as received without further purification.

This invention also relates to the preparation and characterization of shape memory polymers based on chemically cross-linked poly(vinyl alcohol) (PVA) in the presence of 2-carboxyethyl acrylate oligomers (CEA), multi-wall carbon nanotubes (MWCNTs) CNT-50 and CNT-75 followed by exposure to ionizing radiation to complete the crosslinking process. In one composition carbon nano tubes 50 (CNT50) and/or carbon nano tube 75 (CNT 75) is mixed with PVA to form a shape memory polymer (SMP). Characteristics of the CNT are described in Table 1.

TABLE 1

Characteristics and morphology of multi-wall carbon nanotubes.

| Property | CNT 50 | CNT 75 |
|---|---|---|
| Outer diameter distribution | 40-60 nm | 60-80 nm |
| Inner diameter distribution | 10-30 nm | 30-50 nm |
| Length distribution | under 20 μm | under 20 μm |

Figure 1:
FIG. 1 shows appearance recovery in magic mirror and shape recovery of SMP's as shown in prior art.
Figure 1:
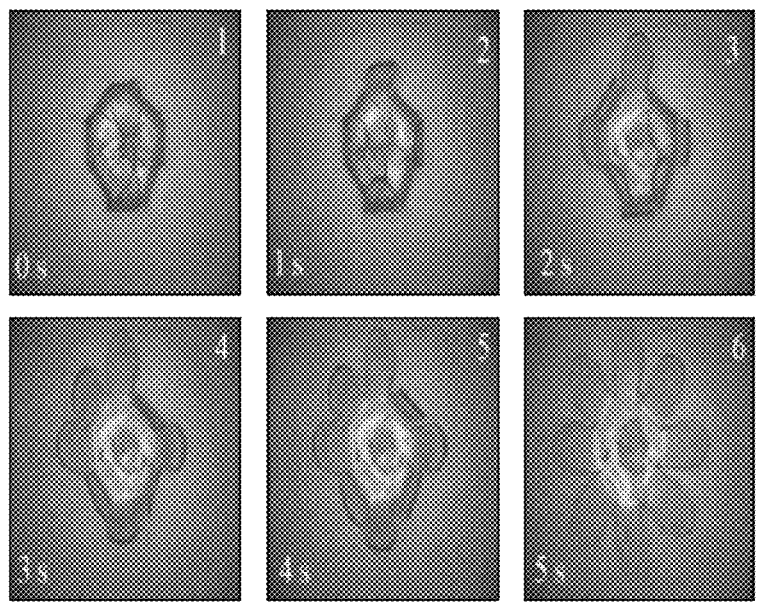
Figure 2:
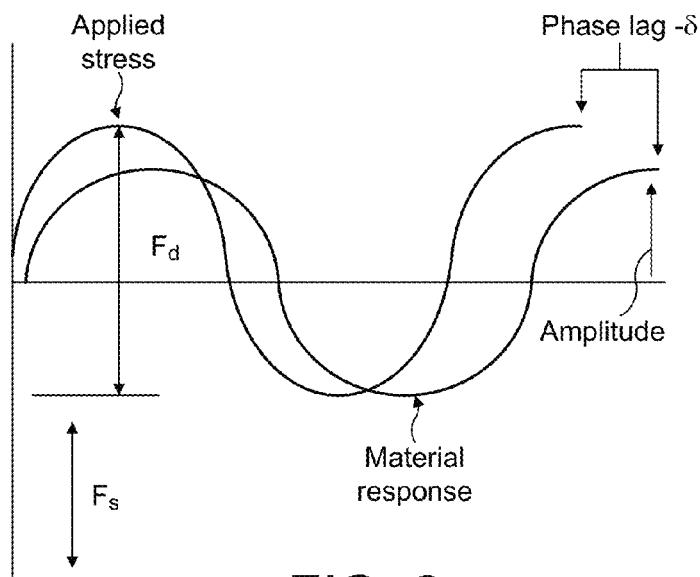
FIG. 2 shows how dynamic mechanical action works according to prior art.
Figure 3:
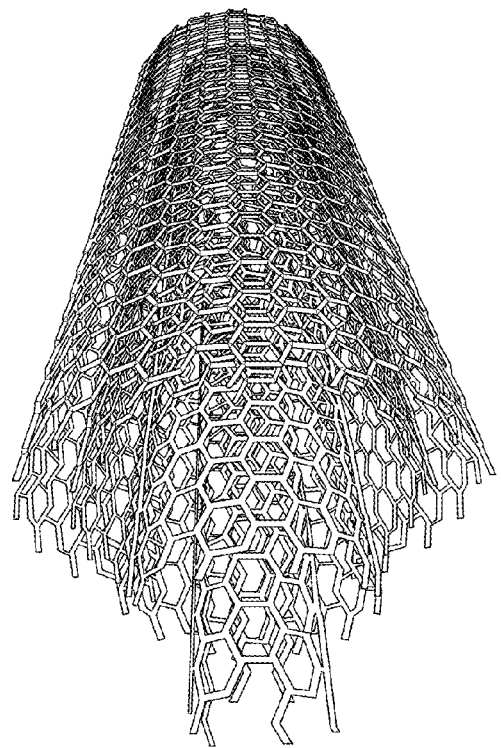
FIG. 3 shows multi-walled carbon nanotubes, in one embodiment.
Figure 4:
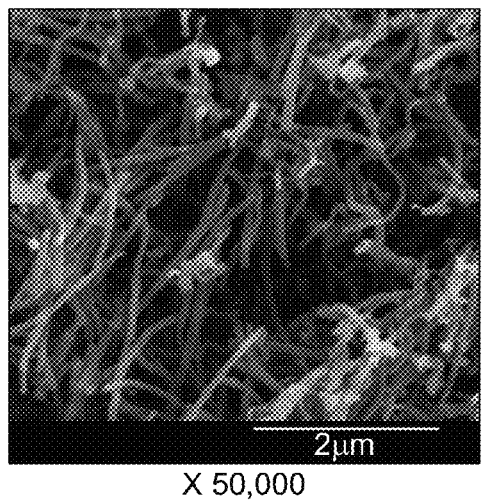
FIG. 4 shows Multi-walled carbon nanotubes (MWCNTs) synthesized by catalytic chemical vapor deposition (CVD) process for CNT-50 and CNT-75.
Figure 4:
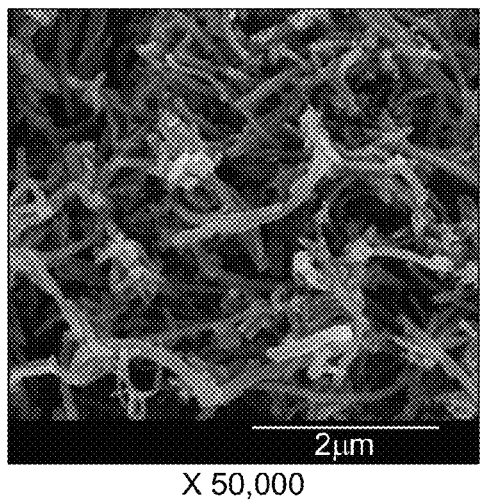
Figure 4:
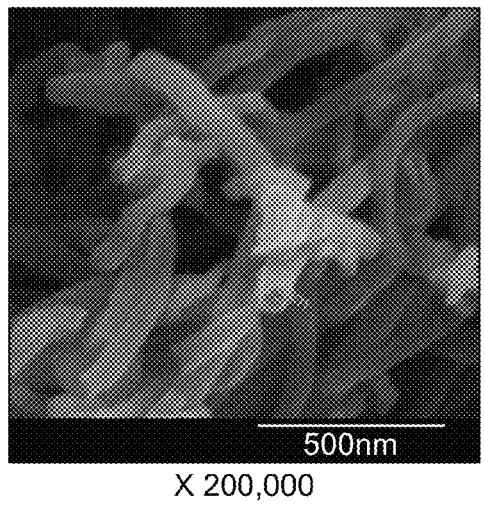
Figure 4:
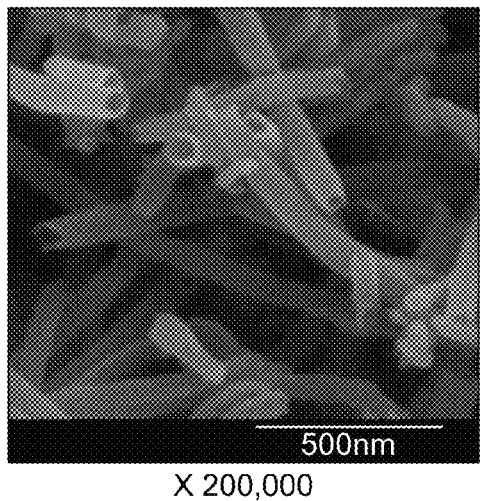

Multi-walled carbon nanotubes (MWCNTs) synthesized by catalytic chemical vapor deposition (CVD) process as shown in FIG. 3. In FIG. 4 CNT 50 is shown on the left and CNT 75 is shown on the right using different magnifications to show the morphology.

Method

In the instant invention several formulations for SMP have been introduced. The categories are:

PVA
(PVA/CEA) at a ratio (9:1)
(PVA/CEA)/CNT-50
(PVA/CEA)/CNT-75.

Also the same formulations with addition of glutaraldehyde as crosslinking agent:

Glut-PVA
Glut-(PVA/CEA) at a ratio (9:1)
Glut-(PVA/CEA)/CNT-50
Glut-(PVA/CEA)/CNT-75

Synthesis PVA solution: PVA solution having 6, 10, 14 w $v^{-1}$% concentrations (w $v^{-1}$% is the amount of material in 100 mL of water) were prepared by dissolving PVA in water for 6 hours at 98° C. The prepared PVA solution was cooled to room temperature and pH of PVA solution was adjusted to 4 with HCl and stored until further use.

Addition of CEA to PVA: The prepared room temperature cooled PVA solution was then mixed with 2-carboxyethyl acrylate oligomers (CEA) (MW 170) in ratio of (9:1) to make solution Preparing the MWCNT: The MWCNTs having a specific measurement such as CNT-50 and CNT-75 were added at a specific concentration of 0.5 w $v^{-1}$% with 0.5 w $v^{-1}$% of sodium dodecyl sulfate (SDS) surfactant as stabilizing agent to make solution 2. They were stored until further use. PVA:CEA solution 1 was prepared with and without CNT, and the mixture was stirred for 3 minutes to make solution 3 that is in the form of a homogeneous mixture. The homogeneous mixture solution 3 was then injected into certain shaped glass tubes (V-shape, coiled-shape, straight-shape and plates) with a diameter of 5 mm as SMP-PVA films. The SM-PVA films were prepared by solution casting method. The crosslinking reaction was conducted for 36 hours at room temperature (25° C.). After being washed with deionized water to neutral, the SMP-PVA films samples were dried for 48 hours at room temperature under vacuum.

The formulations of PVA with CNT 50 and CNT 75 are represented in Table 2. Also the formulations of (PVA) with 2-carboxyethyl acrylate oligomers (CEA), CNT 50 and CNT 75 are presented in Table 3.

The irradiation source was calibrated using aqueous ferrous sulfate (Fricke dosimetry) solution according to ASTM Standard Practice E1026, (1997). The typical dose rate was 6.90151 kGy/hour and transit dose was estimated to be 12.07 Gy/second.

TABLE 2

Formulation for polyvinyl alcohol (PVA) with CNT 50 and CNT 75.

| Code | Dose (kGy) | Code | Dose (kGy) |
|---|---|---|---|
| C50-5k | 5 | C75- 5k | 5 |
| C50-10k | 10 | C75- 10k | 10 |
| C50-15k | 15 | C75- 15k | 15 |
| C50-20k | 20 | C75- 20k | 20 |
| C50-25k | 25 | E75- 25k | 25 |
| C50-50k | 50 | C75- 50k | 50 |
| C50-75k | 75 | C75- 75k | 75 |
| C50-100k | 100 | C75- 100k | 100 |

Note:
PVA concentration: 10 w v$^{-1}$ %,
CNT concentration: 0.5 w v$^{-1}$ %.

TABLE 3

Formulation for polyvinyl Alcohol (PVA) with 2-carboxyethyl acrylate oligomers (CEA), CNT 50 and CNT 75.

| Code | Dose (kGy) | Code | Dose (kGy) |
|---|---|---|---|
| E50-5k | 5 | E75- 5k | 5 |
| E50-10k | 10 | E75- 10k | 10 |
| E50-15k | 15 | E75- 15k | 15 |
| E50-20k | 20 | E75- 20k | 20 |
| E50-25k | 25 | E75- 25k | 25 |
| E50-50k | 50 | E75- 50k | 50 |
| E50-75k | 75 | E75- 75k | 75 |
| E50-100k | 100 | E75- 100k | 100 |

PVA concentration: 10 w v$^{-1}$ %,
PVA:CEA ratio: 9:1,
CNT concentration: 0.5 w v$^{-1}$ %.

Chemical crosslinking: To the above mentioned PVA-CEA, PVA-CEA-CNT-50 and PVA-CEA-CNT-75 as solution 2, glutaraldehyde at certain concentration such as 4 ml (25%) was added to 100 ml aqueous PVA solution was added and then the mixture was stirred for 3 minutes to make a homogeneous mixture. The homogeneous mixture was then injected into certain shaped glass tubes (V-shape, coiled-shape, straight-shape and plates) with a diameter of 5 mm, designed in our laboratory. The SM-PVA films were prepared by solution casting method. The crosslinking reaction (chemical crosslinking) was conducted for 36 hours at room temperature (25° C.). After being washed with deionized water to neutral, the samples were dried for 48 hours at room temperature under vacuum.

Radiation crosslinking: After preparation the casted samples (SM-PVA films) without glutaraldehyde; PVA, PVA-CEA, PVA-CEA-CNT-50 and PVA-CEA-CNT-75 and the casted samples (SM-PVA films) with glutaraldehyde; The PVA-G, PVA-CEA-G, PVA-CEA-CNT-50 and PVA-CEA-CNT-75 SMP-PVA films were packaged in air into sealed polyethylene specimen bags separately and then irradiated to 5, 10, 15, 20, 25, 50, 75, 100 kGy at room temperature using 60Co gamma rays source model Gamma Cell 220 from MDS Nordion, Canada. This unit was used for all irradiation studies. The source was calibrated using aqueous ferrous sulfate (Fricke dosimetry) solution according to ASTM Standard Practice E1026, (1997). The typical dose rate was 6.90151 kGy/hour and transit dose was estimated to be 12.07 Gy/second. The radiation cross linked SM-PVA films reached 100% gelation at an irradiation dose of 50 kGy. The present invention involves a reliable method for the preparation of shape memory polymers based on chemically cross linked and radiation-cross linked poly (vinyl alcohol) (PVA).

Characterization

Gel fraction: The gel content (fraction) in the dried SMP samples was estimated by measuring its insoluble part after extraction in distilled water for 48 h at 60° C. Then, they were taken out and washed with hot water to remove the soluble part, dried, and weighed. The gel fraction was calculated according to Eq. (1). The ratio of the remaining mass of insoluble material (dried to constant weight in a vacuum oven) to original mass was defined as Gel (%) as follows:

$$\mathrm{Gel}(\%) = \frac{\mathrm{mass\ of\ residue\ (g)}}{\mathrm{original\ mass\ (g)}} * 100 \qquad (1)$$

Values above 90% can be reached and indicate a good yield of crosslinking.

$$100-\mathrm{Gel}\ (\%) = \mathrm{sol}\ (\%) \qquad (2)$$

Thermogravimetric Analysis (TGA): The thermo gravimetric analysis (TGA) for SMP was carried out using a TGA machine (Perkin Elmer TGA7, USA) from ambient temperature up to 600° C. under nitrogen atmosphere at a heating rate of 5° C./minute. Transition temperature at Tan δ of radiation cross linked SMP decreased significantly by 6 and 13° C. due to addition of MWCNTs. In addition Tan δ of SM-PVA increases as the irradiation doses increases. Depending on irradiation dose, the transition of Tan δ appears over the range from 55 to 84° C. while in the presence of CEA, it varied from 33 to 88° C. The developed compositions show promising shape memory polymer behavior of radiation cross linked SMP for biomedical applications based on the range of temperatures of Tan δ.

Dynamic Mechanical Analysis (DMA): Dynamic mechanical analysis (DMA) by PerkinElmer Inc., USA, in tensile loading was used to determine the $T_g$, onset of $T_g$ and rubbery modulus (Er) of the networks. The samples were thermally equilibrated at $T_{low}$: −50° C. for 3 minutes and then heated to $T_{high}$: 280° C. at a rate of 5° C./minute. Applied static force of 110 mN, dynamic force of 110 mN, frequency of 1 Hz. $T_g$ is defined to be the peak of tan delta. Samples were measured in triplicates.

Scanning Electron Microscopy (SEM): An SEM, Model JSM 5800 LV from Jeol Co., Japan was used. Maximum enlargement of the SEM is 300,000 with a resolution of 3.5 nm. Both low and high vacuum measurements were performed. Prior to examination, the samples were dried under sputter-coated gold.

Figure 5:
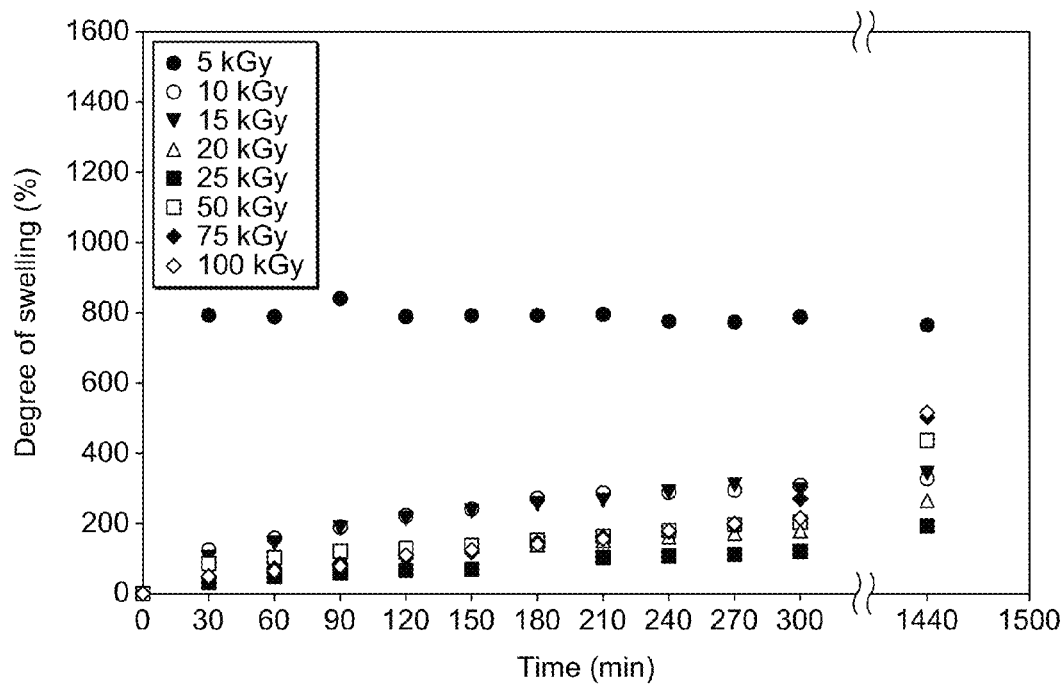
FIG. 5 shows degree of swelling of 6% PVA as a function of irradiation dose.

It is well known that radiation-induced polymerization and crosslinking have advantages over chemical crosslinking and it is widely used in recent years for the synthesis of various hydrogels for biomedical applications. The absorption of water was evaluated by performing swelling tests on the PVA gel at ambient temperature. The basic feature of the hydrogel is to absorb and hold huge amount of water in its network structure. FIG. 5 shows the equilibrium swelling profile of the γ-irradiated PVA concentrations 6 w v$^{-1}$% hydrogel. The equilibrium swelling response was investigated using PVA concentrations 6 w v$^{-1}$% hydrogel. The samples SM-PVA were irradiated for absorbed doses of 5, 10, 15, 20, 25, 50, 75 and 100 kGy. Three samples were irradiated for each dose point. It was found that there are decreases in the swelling degree of the prepared hydrogels with the increase of the irradiation dose.

Figure 6:
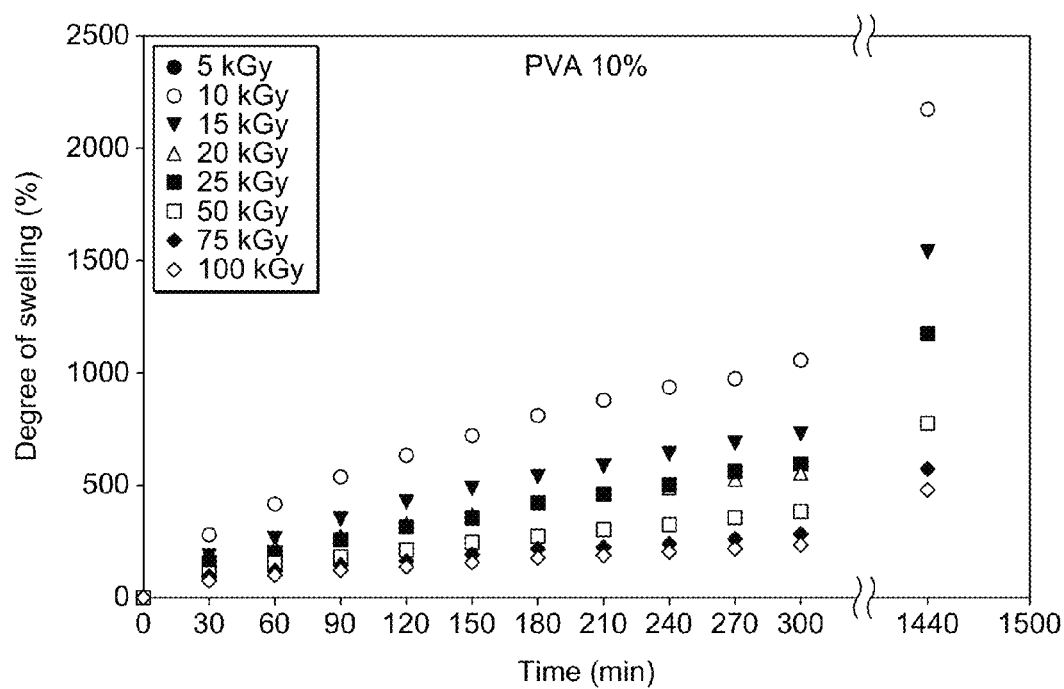
FIG. 6 shows degree of swelling of 10% PVA as a function of irradiation dose.

FIG. 6 shows the equilibrium swelling profile of the γ-irradiated PVA at concentration of 10 w v$^{-1}$% hydrogel. The equilibrium swelling response was investigated using PVA concentration of 10 w v$^{-1}$% hydrogel. The samples were irradiated for absorbed doses of 5, 10, 15, 20, 25, 50, 75 and 100 kGy. Three samples were irradiated for each dose point. It is clear that with increase of the irradiation dose the swelling degree of the prepared hydrogels decreases.

Figure 7:
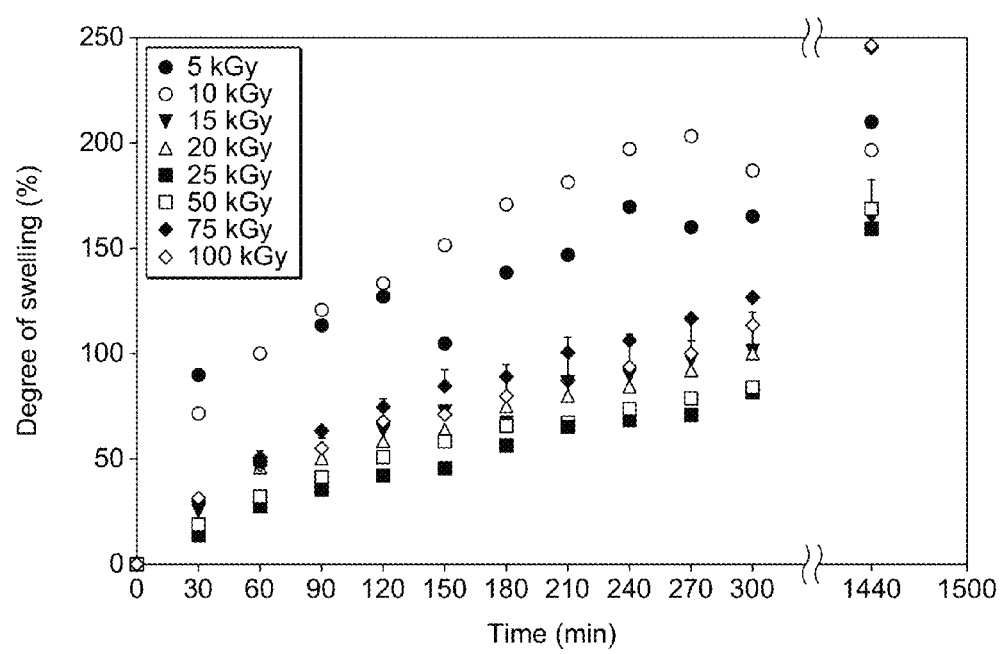
FIG. 7 shows degree of swelling of 14% PVA as a function of irradiation dose.

FIG. 7 shows the equilibrium swelling profile of the γ-irradiated PVA at concentration of 14 w v$^{-1}$% hydrogel. The equilibrium swelling response was investigated using PVA concentration of 14 w v$^{-1}$% hydrogel. The samples were irradiated for absorbed doses of 5, 10, 15, 20, 25, 50, 75 and 100 kGy. Three samples were irradiated for each dose point. It is clear that with increase of the irradiation dose, the swelling degree of the prepared hydrogels decreases.

Figure 8:
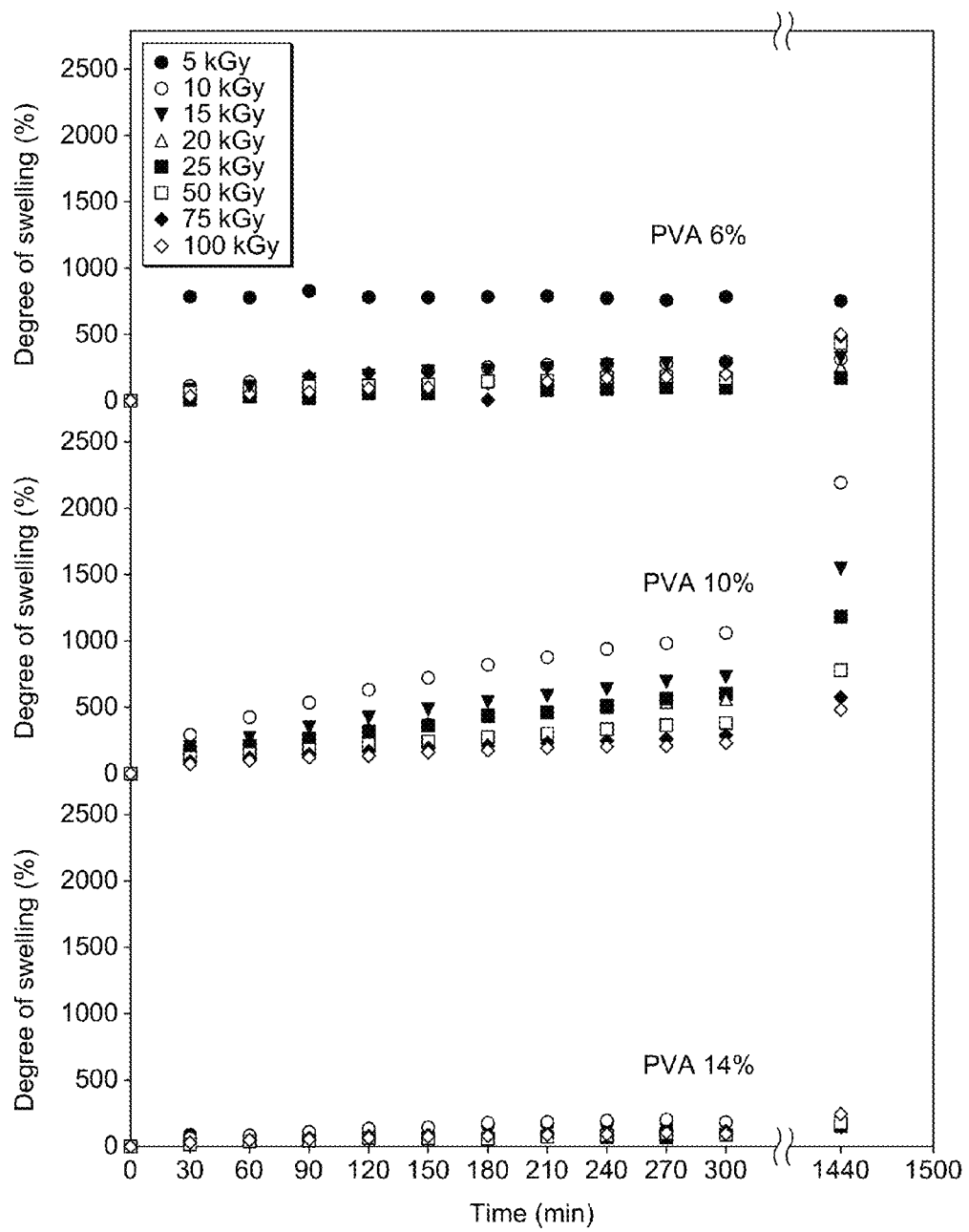
FIG. 8 shows degree of swelling of various PVA concentrations as a function of irradiation dose.

FIG. 8 shows the effect of various PVA concentrations of 6, 10, 14 w v$^{-1}$% on degree of swelling against irradiation dose. It is clear that with increase both PVA content in the feed solution and irradiation dose, the swelling degree of the prepared hydrogels decreases.

Synthetic polymer hydrogels display controlled gelation process, structure, and mechanical properties. Ionizing radiation has been found to be widely applicable in modifying the structure and properties of polymers, and can be used to tailor the performance of either bulk materials or surfaces. In practical terms, the gelation can be defined as a dose for which the smallest amount of gel can be separated from the system. Further irradiation of the sample over the gelation dose increases the amount of gel fraction, although a part of macromolecules may be still left unbound (sol fraction).

Figure 9:
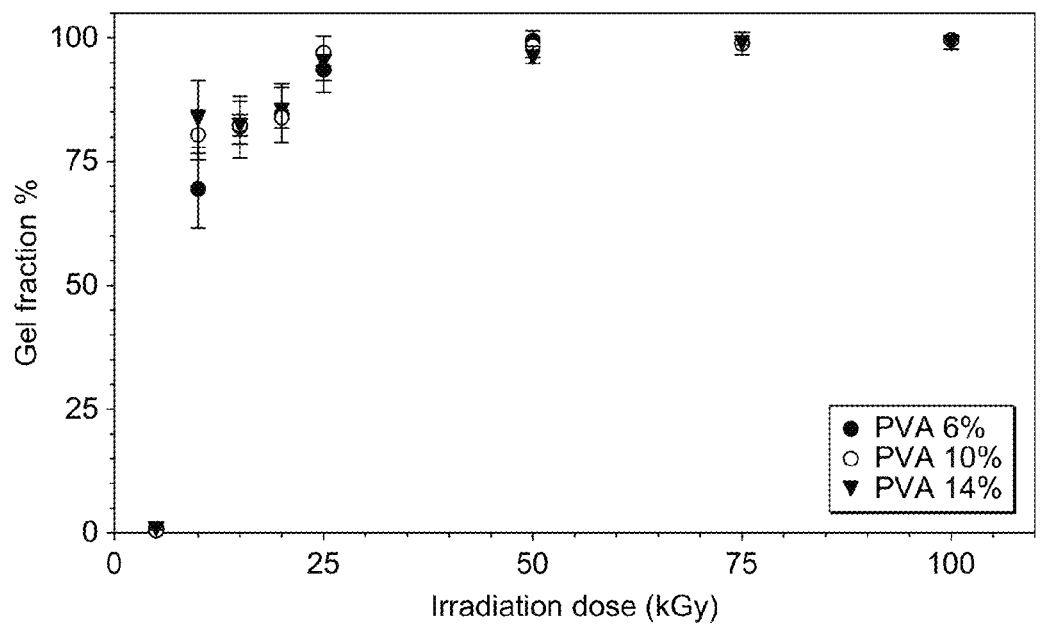
FIG. 9 shows Gel fractions (%) of various PVA concentrations as a function of irradiation dose.

FIG. 9 shows the effect of various PVA concentrations of 6, 10, 14 w v$^{-1}$% on gel fractions % against irradiation dose. It is clear that with increasing of both PVA content in the feed solution and irradiation dose up to irradiation dose of 25 kGy, the gelation degree of the prepared hydrogels increases to reach 100% gelation at an irradiation dose of 50 kGy.

Figure 10:
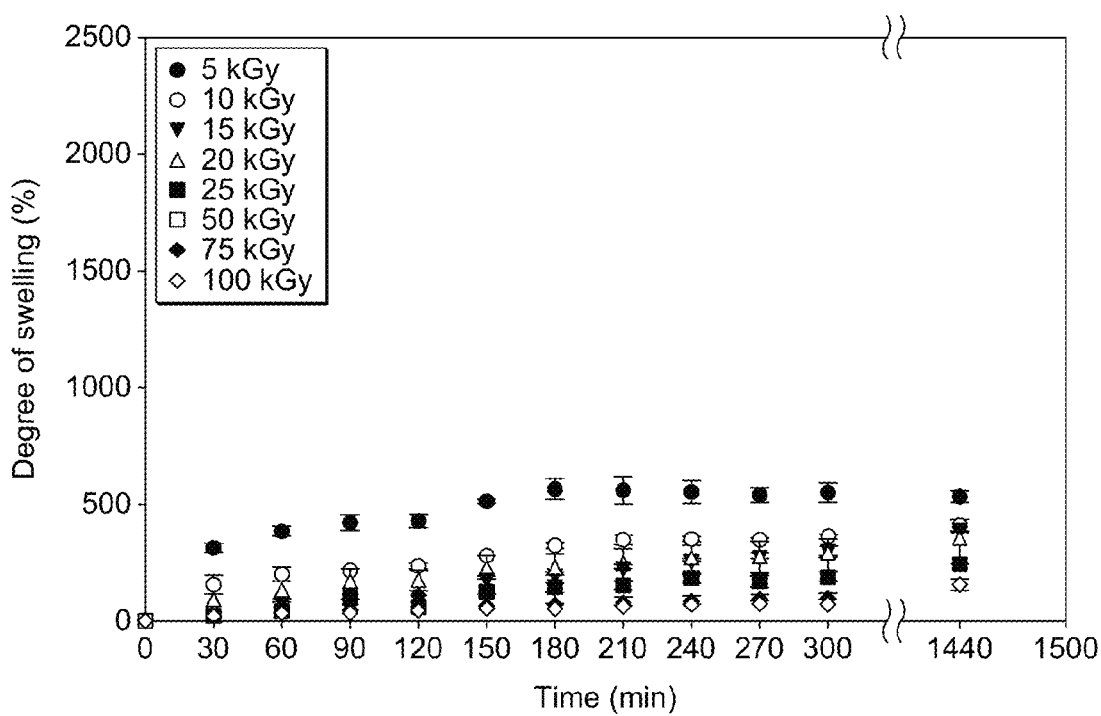
FIG. 10 shows degree of swelling of 10% (polyvinyl alcohol/2-carboxyethyl acrylate oligomers) (PVA/CEA) at ratio (9:1) as a function of irradiation dose.

FIG. 10 shows the equilibrium swelling profile of the γ-irradiated (PVA/CEA) at ratio (9:1) hydrogel as a function of irradiation dose. The samples were irradiated for absorbed doses of 5, 10, 15, 20, 25, 50, 75 and 100 kGy. Three samples were irradiated for each dose point. It is clear that effect of the crosslinking of PVA via irradiation in presence of CEA decrease the swelling degree of the prepared hydrogels. When an aqueous mixture of PVA/CEA is irradiated with gamma rays, simultaneous crosslinking of PVA occurred. Grafting of CEA oligomer onto the cross linked PVA polymer chains will take place simultaneously resulting in the formation of insoluble copolymer network (gel). The overall rate of these graft copolymerization processes could influence the gel fraction and swelling of the hydrogel. The stability of the prepared hydrogels against dissolution in hot water is simply known as gelation degree (El-Hag A. and Alarifi A. 2009).

Figure 11:
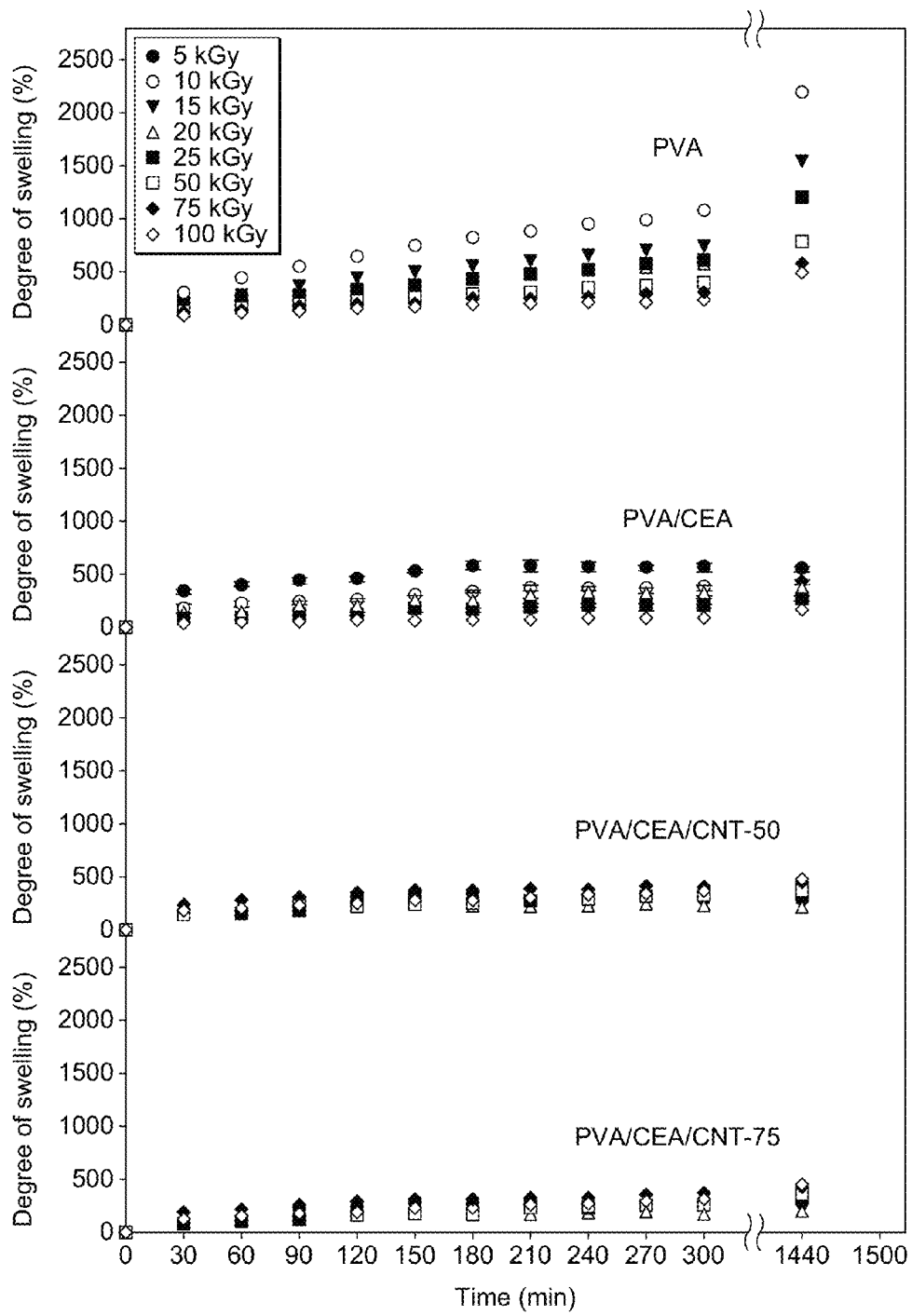
FIG. 11 shows degree of swelling of PVA, (PVA/CEA) at ratio (9:1), (PVA/CEA)/CNT-50 and (PVA/CEA)/CNT-75 as a function of irradiation dose. PVA concentration for all compositions: 10%.

FIG. 11 shows the equilibrium swelling profile of the γ-irradiated PVA, (PVA/CEA) at ratio (9:1), (PVA/CEA)/CNT-50 and (PVA/CEA)/CNT-75 hydrogel as a function of irradiation dose. The samples were irradiated for absorbed doses of 5, 10, 15, 20, 25, 50, 75 and 100 kGy. Three samples were irradiated for each dose point. It is clear that effect of the crosslinking of PVA via irradiation in presence of CEA decrease the swelling degree of the prepared hydrogels. The addition of MWCNT significantly decreases the swelling of overall hydrogel. The unique properties of CNTs, such as very high surface/volume ratio, due to the chemical stability CNTs as filler affect the significant decrease in the swelling degree.

Figure 12:
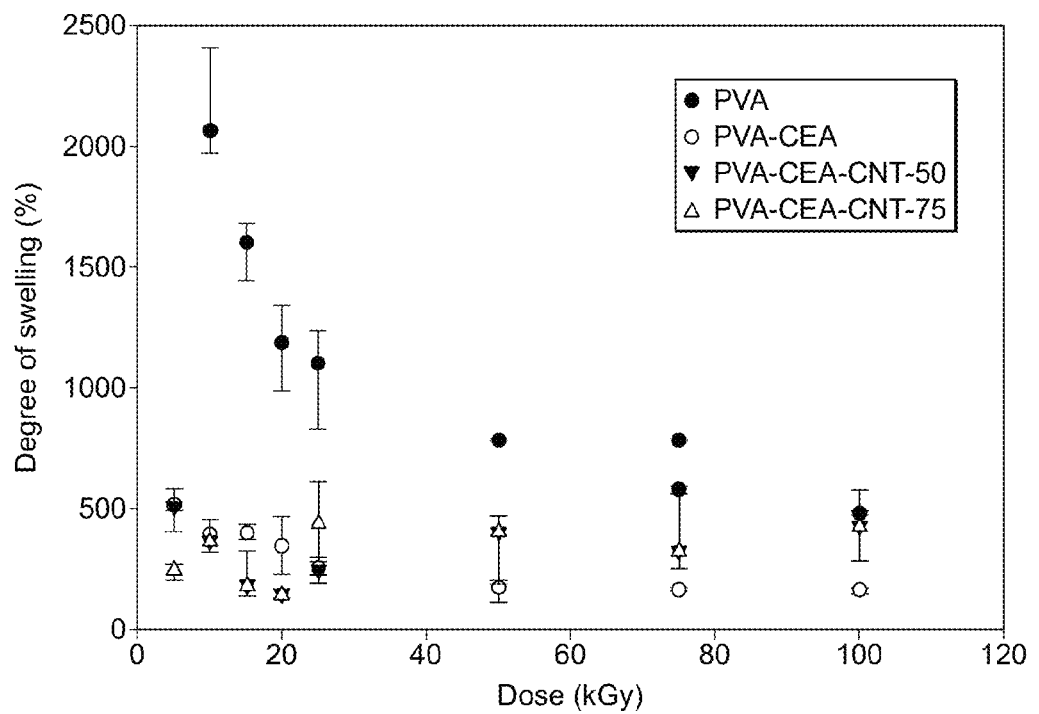
FIG. 12 shows degree of swelling at saturation of PVA, (PVA/CEA) at ratio (9:1), (PVA/CEA)/CNT-50 and (PVA/CEA)/CNT-75 as a function of irradiation dose. PVA concentration for all compositions: 10%.

FIG. 12 shows the equilibrium swelling profile of the γ-irradiated PVA, (PVA/CEA) at ratio (9:1) hydrogel as a function of irradiation dose. The samples were irradiated for absorbed doses of 5, 10, 15, 20, 25, 50, 75 and 100 kGy. Three samples were irradiated for each dose point. It is clear that the crosslinking of PVA via irradiation in presence of CEA decreases the swelling degree of the prepared hydrogels.

Figure 13:
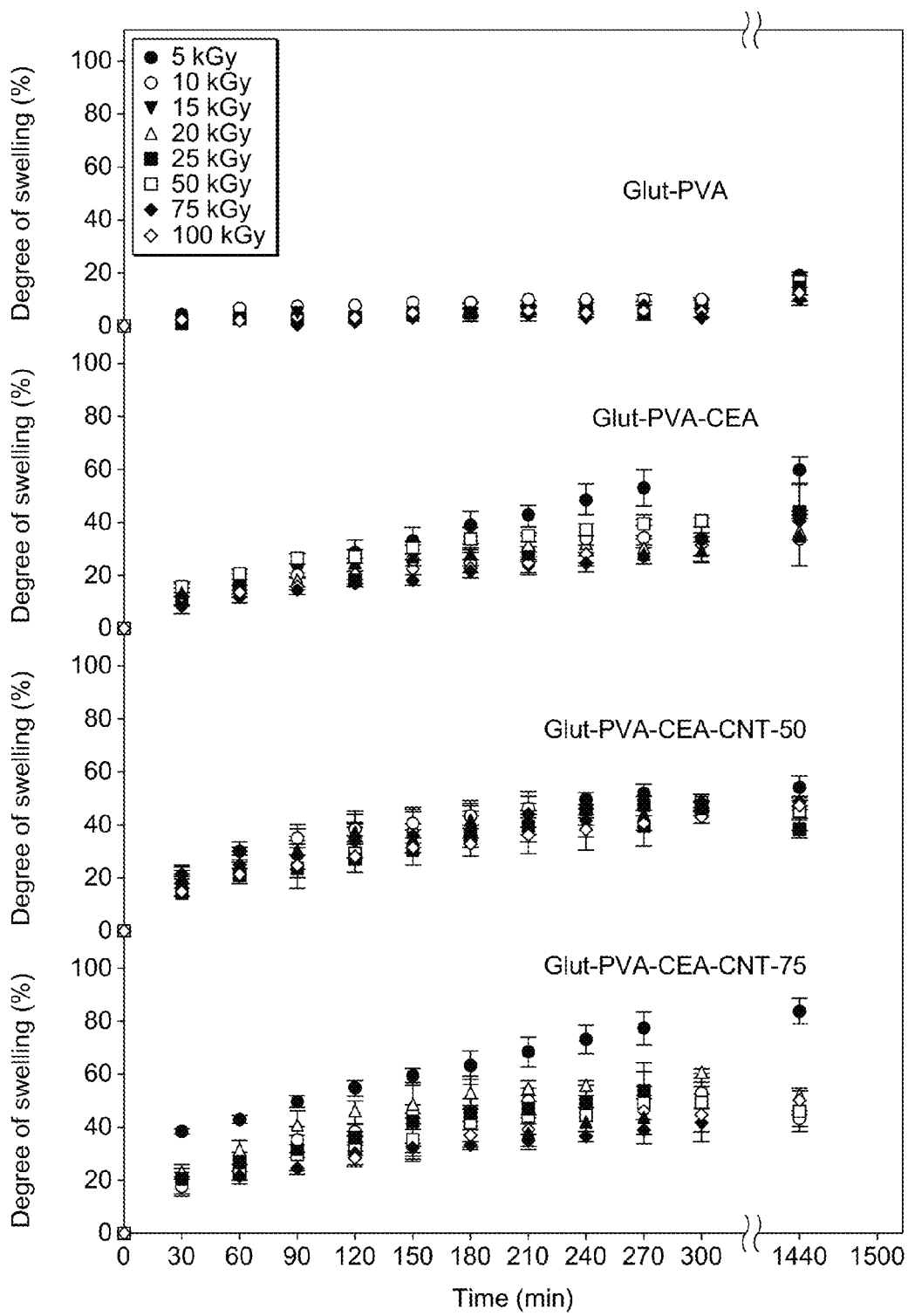
FIG. 13 shows degree of swelling of glutaraldehyde cross linked PVA, (PVA/CEA) at ratio (9:1), (PVA/CEA)/CNT-50 and (PVA/CEA)/CNT-75 as a function of irradiation dose. PVA concentration for all compositions: 10%.

The influence of water content on the prepared materials was investigated. FIG. 13 shows the equilibrium swelling profile of the γ-irradiated PVA hydrogel glutaraldehyde-cross linked PVA, (PVA/CEA) at ratio (9:1), (PVA/CEA)/CNT-50 and (PVA/CEA)/CNT-75 as a function of irradiation dose. The samples were irradiated for absorbed doses of 5, 10, 15, 20, 25, 50, 75 and 100 kGy. Three samples were irradiated for each dose point. It is clear that the chemical crosslinking on PVA as well as irradiation dose significantly decrease the swelling degree of the prepared hydrogels. The addition of CEA increases the side hydroxyl groups along with the backbone formed hydrogen bonding among the adjacent chains, leaving behind a limited number of free hydroxyl groups that lie in polymer chains. The unique properties of CNTs include very high surface/volume ratio, high chemical stability, high electro-catalytic activity and high charge transfer efficiency. All the previous properties of CNTs influenced the significant decrease in the swelling degree.

Figure 14:
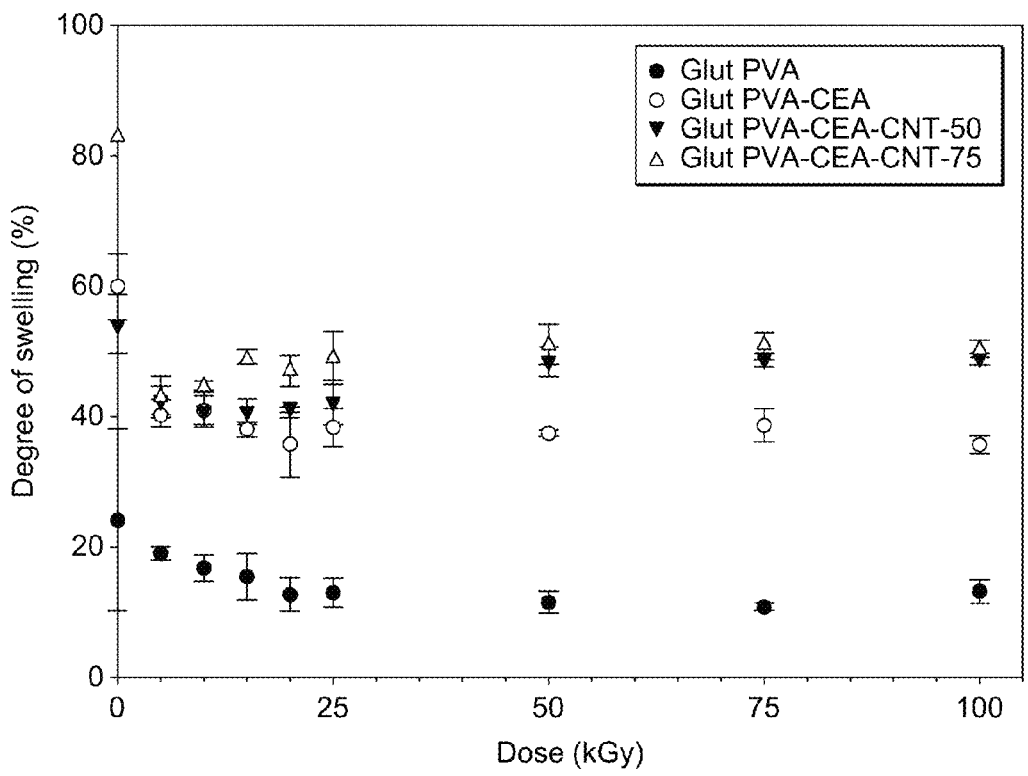
FIG. 14 shows degree of swelling at saturation of glutaraldehyde cross linked PVA, (PVA/CEA) at ratio (9:1), (PVA/CEA)/CNT-50 and (PVA/CEA)/CNT-75 as a function of irradiation dose. PVA concentration for all compositions: 10%.

FIG. 14 shows the degree of swelling at saturation of glutaraldehyde cross linked PVA, (PVA/CEA) at ratio (9:1), (PVA/CEA)/CNT-50 and (PVA/CEA)/CNT-75 as a function of irradiation dose. PVA concentration for all compositions: 10%. The samples were irradiated for absorbed doses of 5, 10, 15, 20, 25, 50, 75 and 100 kGy. Three samples were irradiated for each dose point. It is clear that the chemical crosslinking on PVA as well as irradiation dose significantly decrease the swelling degree of the prepared hydrogels. The addition of CEA increases swelling degree of the prepared hydrogels by increasing the free hydroxyl groups that lie in polymer chains. The unique properties of CNTs include very high surface/volume ratio, high chemical stability, high electro-catalytic activity and high charge transfer efficiency. All the previous properties of CNTs influenced the significant decrease in the swelling degree.

Figure 15:
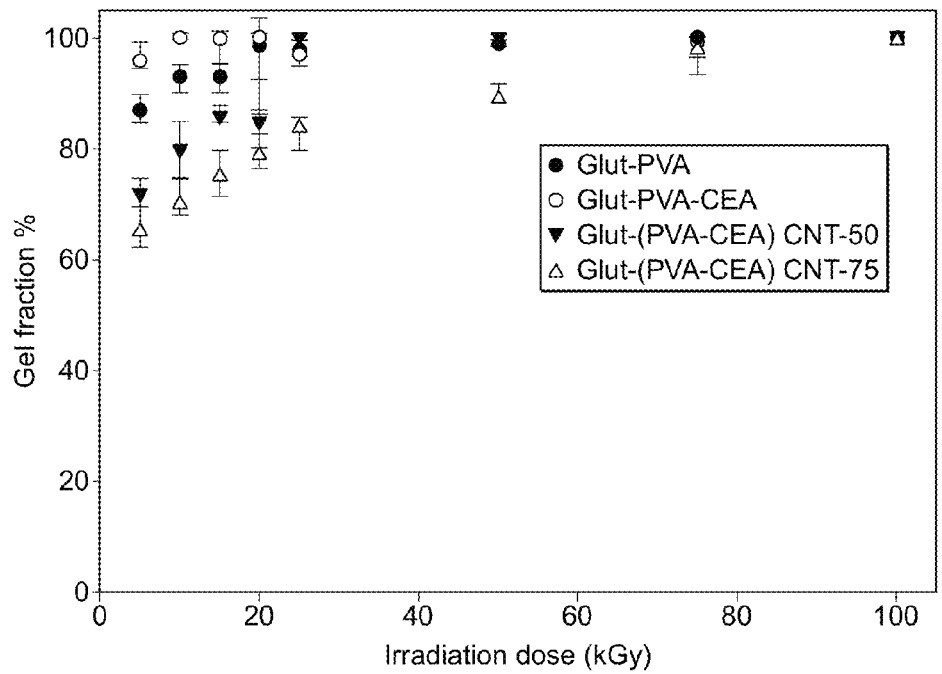
FIG. 15 shows Gel fraction (%) for Glut-PVA, Glut-(PVA/CEA) at ratio (9:1), Glut-(PVA/CEA)/CNT-50 and Glut-(PVA/CEA)/CNT-75 as a function of irradiation dose. PVA concentration for all compositions: 10%.

The degree of gelation of the prepared SM-gel at various irradiation doses is shown in FIG. 15. The crosslinking ratio is one of the most important factors that affect the swelling of hydrogels and their biomedical applications. Highly cross linked hydrogels have a tighter structure, and swell less compared to the same hydrogels with lower crosslinking ratios. The stability of the prepared copolymer-gels against dissolution in solvent is simply known as gelation degree. As shown in FIG. 15 the degree of gelation of the γ-irradiated PVA hydrogel glutaraldehyde-cross linked PVA, (PVA/CEA) at ratio (9:1), (PVA/CEA)/CNT-50 and (PVA/CEA)/CNT-75 as a function of irradiation dose. It is clear that effect of the chemical crosslinking on PVA as well as irradiation dose significantly increases the gel fraction degree of the prepared hydrogels. The presence of CEA hinders the mobility of the polymer chain, hence lowering the swelling ratio leading to increase of the degree of gelation. With the increase of total radiation dose up to 50 kGy, the gel fraction of the hydrogel increases up to 100% gel fraction and the soluble fraction decreases and it results in the formation of high molecular weight hydrogel. Further increase in total radiation dose has increased the network density of the hydrogels and decreased the swelling of the hydrogels.

Figure 16:
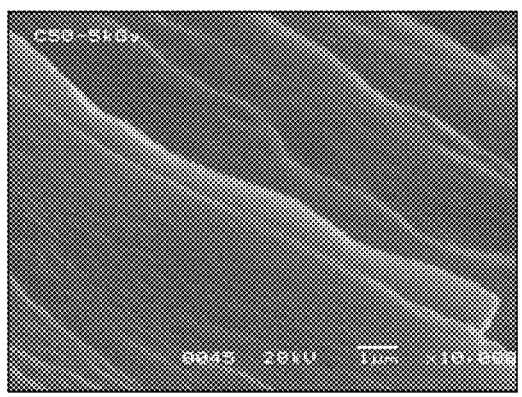
FIG. 16 shows SEM micrographs of irradiated at 5 and 100 kGy for PVA-CNT-50 and PVA-CNT-75, X=10,000.
Figure 16:
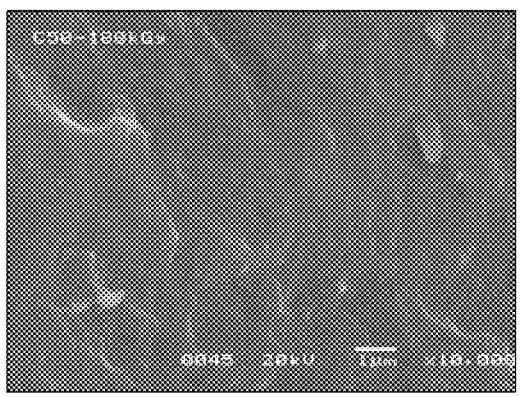
Figure 16:
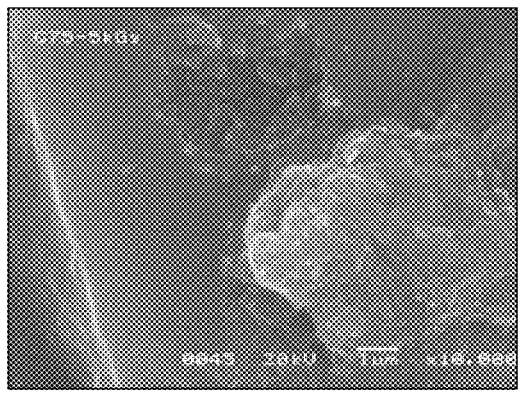
Figure 16:
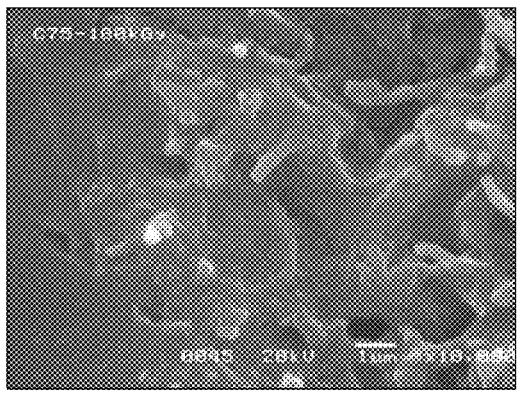

FIG. 16 SEM micrographs of irradiated at 5 and 100 kGy for PVA-CNT-50 and PVA-CNT-75, X=10,000. SEM is a powerful tool for investigating the structure of copolymers because it monitors the superficial changes of the polymer matrix. The changes in morphology of the copolymer matrix were investigated by SEM. FIG. 15 shows SEM micrographs of the poly(vinyl alcohol) in the presence of Multi-wall carbon nanotubes (MWCNTs); CNT-50 and CNT-75 irradiated to absorbed doses of 5 and 100 kGy. An important property for the preparation of SMP is the suitable distribution of filler chains within the polymeric matrix. Also the micrographs of PVA-CNT-50, PVA-CNT-75 are magnified at 10 kX. The micrographs were taken on a cut edge of the copolymers. It can be seen that, the pure PVA-CNT-50, PVA-CNT-75 have a smooth surface.

Figure 17:
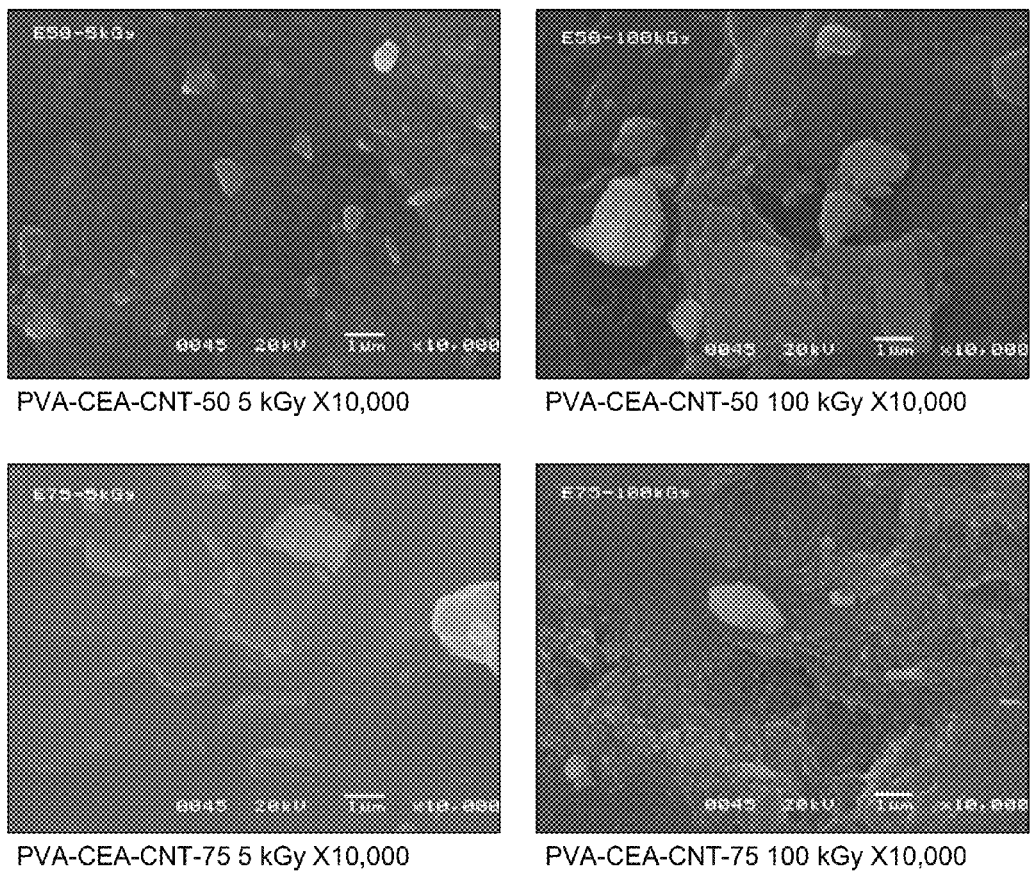
FIG. 17 shows SEM micrographs of irradiated at 5 and 100 kGy for PVA-CEA-CNT-50- and PVA-CEA-CNT-75, X=10,000.

FIG. 17 shows SEM micrographs of PVA in the presence of CEA, MWCNTs; CNT-50 and CNT-75 irradiated to absorbed doses of 5 and 100 kGy. The micrographs of PVA-CEA-CNT-50 and PVA-CEA-CNT-75 are magnified at 10 kX. The micrographs were taken on a cut edge of the copolymers. It can be seen that, the smoothness surface of the pure PVA-CNT-50, PVA-CNT-75, is altered when PVA (CEA) mixed with PVA-CNT-50 or PVA-CNT-75, and a rough surface was obtained. The rough surface of the grafted polymer is due to the occurrence of grafting.

Figure 18:
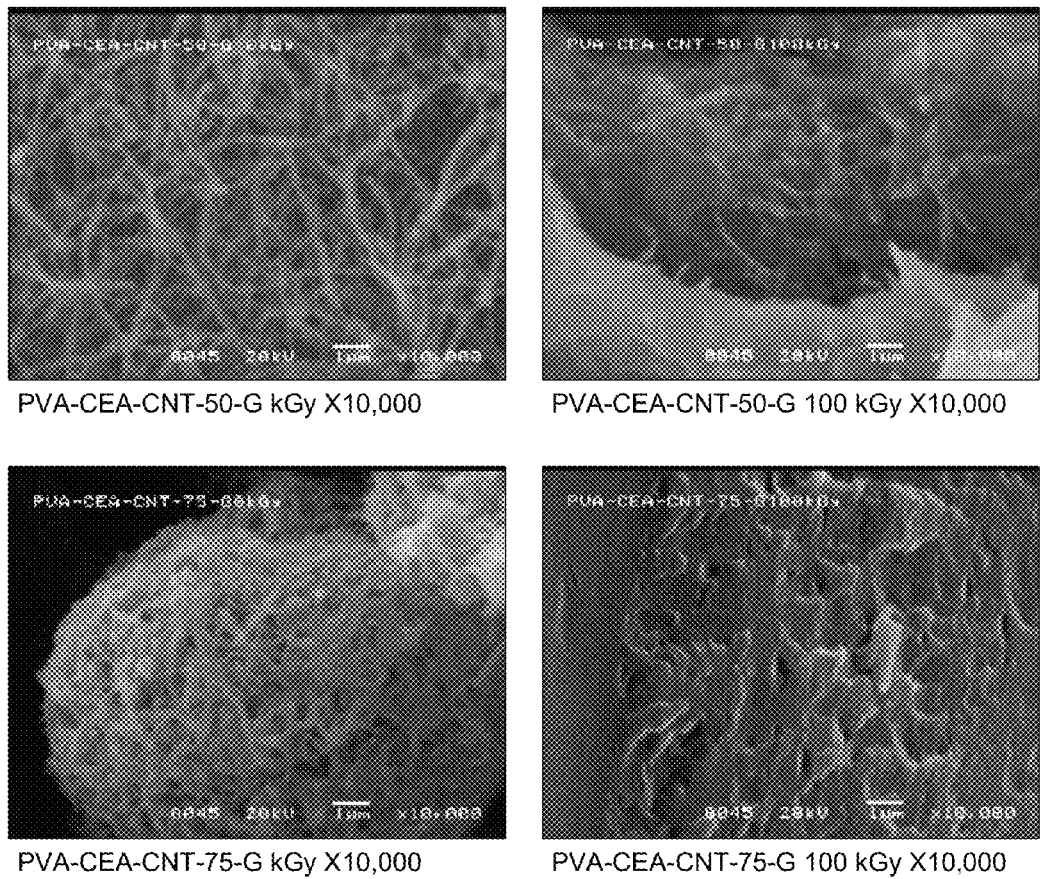
FIG. 18 shows SEM micrographs of unirradiated and irradiated at 100 kGy for Glut-PVA and Glut-PVA-CEA, X=10,000.

FIG. 18 shows SEM micrographs of unirradiated and irradiated at 100 kGy for Glut-PVA and Glut-PVA-CEA, X=10,000. FIG. 18 shows SEM micrographs of the PVA hydrogel glutaraldehyde cross linked PVA, (PVA/CEA) at ratio (9:1) unirradiated and irradiated to absorbed dose of 100 kGy. The micrographs were taken on a cut edge of the copolymers. The CEA introduced irregularities in the morphology of the PVA network. The micrographs were taken on a cut edge of the copolymers. The addition of the MWCNT (CNT-50 and CNT75) disturbed the network structure and morphology and some particles of CNTs are clear in FIG. 18 at 10 kX of magnification, with size in range 200-300 nanometers. They are probably due to some agglomerates of MWCNTs, CNT-50-G and CNT-75-G. It is observed that carbon nanotubes exhibited relatively good dispersion in SMP and were distributed randomly. It is confirmed that the size of carbon nanotubes in the material is 200-300 nanometers in diameter and several microns in length. It is evident that an interconnected conducting network has been formed in the developed SM-PVA/CNT.

PVA is a typical semi-crystalline polymer; because of the hydrogen bonding between hydroxyl groups, high physical interactions between polymer chains contribute to the high storage modulus at low temperature. It can be seen that the presence of glutaraldehyde initial storage modulus of SM-PVA indicating the addition of glutaraldehyde decreases the number of hydroxyl groups and weakens the hydrogen bonding interaction.

TABLE 4

Tan δ of glutaraldehyde cross linked PVA, (PVA/CEA) at ratio (9:1), (PVA/CEA)/CNT-50 and (PVA/CEA)/CNT-75 as a function of irradiation dose. PVA concentration for all compositions: 10%

| Dose (kGy) | PVA-CEA-CNT-50 | PVA-CEA-CNT-75 | PVA-CEA | PVA |
|---|---|---|---|---|
| 0 | 6 | 13 | 33 | 55 |
| 5 | 31 | 56 | 51 | 63 |
| 25 | 53 | 64 | 88 | 84 |
| 50 | 54 | 68 | 70 | 58 |
| 100 | 81 | 129 | 61 | 72 |

Figure 19:
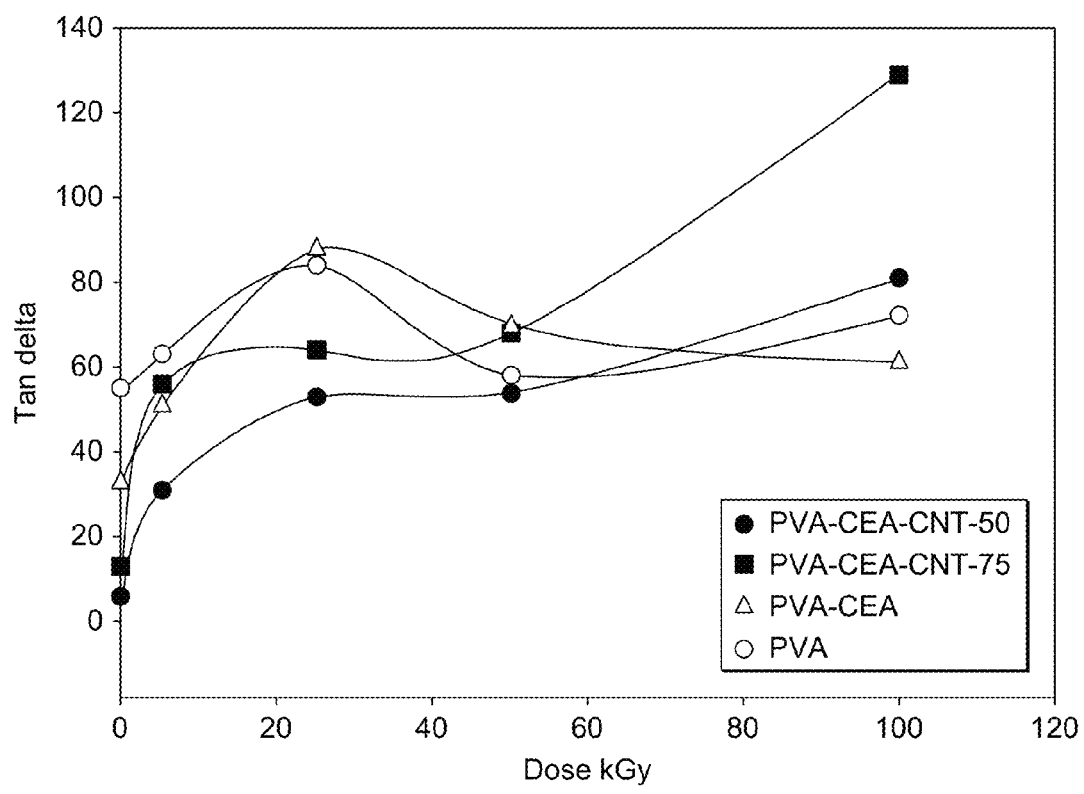
FIG. 19 shows SEM micrographs of unirradiated and irradiated at 100 kGy for Glut-PVA-CEA-CNT-50-and Glut-PVA-CEA-CNT-75, X=10,000.

FIG. 19 and Table 4 present Tan δ of glutaraldehyde cross linked PVA, (PVA/CEA) at ratio (9:1), (PVA/CEA)/CNT-50 and (PVA/CEA)/CNT-75 as a function of irradiation dose. It is clear that the variation of the Tan δ values was affected by the irradiation doses and the addition of CEA to the PVA network, and also addition of the MWCNT; NCT-50 and CNT-75 decreases the Tan δ due to interactions between polymer chains.

In addition, it will be appreciated that the novel SMP for medical use disclosed herein may be embodied using means for achieving better material for medical use and diagnosis. Accordingly, the specification and drawings are to be regarded in an illustrative rather than a restrictive sense.

INDUSTRIAL APPLICABILITY

Shape memory polymer as medical devices offer advantages over traditional medical devices including blood vessel stents, bone implants and medical devices used for minimally invasive surgery. One of the key advantages is that, it can be implanted into the surgical site in an impermanent, compact geometry and then be initiated to deploy into a different, long-lasting geometry to attain a specific surgical goal, such as suture or soft tissue for bone grafts, plastic surgery or stents.

What is claimed is:

1. A method of making a shape memory polymer, comprising:
   mixing a poly vinyl alcohol solution and a 2-carboxyethyl acrylate oligomer at a specific ratio to make solution 1;
   adding a carbon nano tube having a specific measurement dispersed in a specific concentration with a sodium dodecyl sulfate surfactant to the solution 1 to make solution 2;
   mixing a chemical crosslinking agent to solution 2 before irradiation at a certain concentration; and
   irradiating the solution 2 using a gamma ray source in the range of 5-100 kGy to make the shape memory polymer to be used for biomedical applications.

2. The method of making the shape memory polymer of claim 1, wherein the chemical crosslinking agent is glutaraldehyde.

3. The method of making the shape memory polymer of claim 1, wherein the certain concentration is 4 ml (25%) crosslinking agent was added to 100 ml aqueous PVA solution.

4. The method of making the shape memory polymer of claim 1, wherein the specific ratio is for poly vinyl alcohol solution and the 2-carboxyethyl acrylate oligomer is 9:1.

5. The method of making the shape memory polymer of claim 1, wherein the specific measurement of carbon nano tube is at least one a 50 and 75.

6. The method of making the shape memory polymer of claim 1, wherein the specific concentration of carbon nano tubes is 10-0.5 w $v^{-1}$% with 0.5 w $v^{-1}$% of the sodium dodecyl sulfate.

7. A method of making a shape memory polymer, comprising:

dissolving poly vinyl alcohol solution using a water 6-14 w $v^{-1}$% for 6 hours at 98° C.;

mixing the poly vinyl alcohol solution with 2-carboxyethyl acrylate oligomers in ratio of 9:1 to form a solution 1;

dispersing a carbon nano tube of a specific size at a concentration of 0.5 w $v^{-1}$% with 0.5 w $v^{-1}$% of sodium dodecyl sulfate (SDS) surfactant as stabilizing agent to form a carbon nano tube solution to form a solution 2; and mixing the solution 1 and solution 2 to form a PVA/CEA/CNT solution to form a SM-PVA film.

8. The method of making the shape memory polymer as in claim 7, further comprising:

irradiating the cross linked PVA/CEA/CNT solution using 5-100 kGy to obtain a shape memory polymer.

9. The method of making the shape memory polymer as in claim 7, further comprising:

mixing a glutaraldehyde solution to a PVA/CEA/CNT solution to crosslink for 36 hours at 25° C. to get a cross linked PVA/CEA/CNT solution; and irradiating the cross linked PVA/CEA/CNT solution using 5-100 kGy to obtain a shape memory polymer.

10. The method of making the shape memory polymer as in claim 9, wherein the glutaraldehyde solution is used at 25% concentration.

\* \* \* \* \*